INVENTOR
JOE H. SHOCKOR

Sept. 19, 1972  J. H. SHOCKCOR  3,692,661
APPARATUS FOR REMOVING POLLUTANTS AND IONS FROM LIQUIDS
Filed Sept. 17, 1969  6 Sheets-Sheet 5

INVENTOR
JOE H. SHOCKOR
BY
Curtis, Morris & Safford
ATTORNEYS

Sept. 19, 1972   J. H. SHOCKCOR   3,692,661
APPARATUS FOR REMOVING POLLUTANTS AND IONS FROM LIQUIDS
Filed Sept. 17, 1969   6 Sheets-Sheet 6

INVENTOR
JOE H. SHOCKOR
BY
Curtis, Morris & Safford
ATTORNEYS

United States Patent Office 3,692,661
Patented Sept. 19, 1972

3,692,661
APPARATUS FOR REMOVING POLLUTANTS AND IONS FROM LIQUIDS
Joe H. Shockcor, Guilford, Conn., assignor to Resource Control, Inc., West Haven, Conn.
Filed Sept. 17, 1969, Ser. No. 858,758
Int. Cl. C02b 1/82; B01d 43/00
U.S. Cl. 204—269
9 Claims

ABSTRACT OF THE DISCLOSURE

Apparatus and method for electrochemically removing ions and other contaminants from aqueous liquids by passing the liquid to be treated into a treatment vessel wherein a plurality of cathodes and anodes are positioned to form a number of treatment cells. The cathodes and anodes are connected to a source of direct current and a bed comprising a multitude of solid elements forming a medium of low electrical conductivity is placed about the cathodes and anodes. The cathodes and anodes are positioned so that they form a circuitous path for the liquid being treated as it passes through the bed while flowing through the vessel.

BACKGROUND OF THE INVENTION

This invention relates to an apparatus and method of treating aqueous liquids to remove from them ions and other contaminants. More particularly, the liquids are those which result from waste or spent process solutions or other polluted or contaminated liquids.

While there have been attempts to reduce pollution of streams and other bodies of water for a long time, in recent years the action of governments and regulatory agencies has increased the responsibility of industries and others to stop polluting bodies of water.

Many methods have been suggested to accomplish this. The best means of treating dilute wastes such as those from metal finishing plants and the like is a method using a bed of low electrical conductivity formed by a multiplicity of electrically conductive elements. A preferred form of the elements is carbonaceous pellets of generally cylindrical shape having a diameter of about 2 mm. and a length of about 5 to 6 mm. Electrodes to serve as an anode and a cathode are inserted into the bed and connected to a source of direct current. The applied voltage may be in the preferred range of 2 to 18 volts.

When direct current is applied to the electrodes a condition of bipolarity is created in the packing elements. This creates a number of electrode sites and the desired oxidation and/or reduction reactions taken at the electrode sites within the bed.

SUMMARY OF THE INVENTION

An object of the present invention is to provide an improved apparatus for carrying out the aforesaid method. To accomplish this a treatment vessel is provided in which a plurality of cathodes and anodes are placed to form a number of cells. A bed of packing elements is placed in each cell and the cathodes and anodes connected to a direct current source. The anodes are positioned across the vessel but spaced above the bottom vessel wall. The cathodes are located between the anodes and are adjacent the bottom wall while also extending across the vessel. Thus, the cathodes and anodes form a baffle system providing a circuitous flow path for liquid passing through the vessel. This apparatus provides a continuous system insuring maximum treatment of the liquid. Advantageously, the cathodes are of decreasing heights in sequential arrangement so that flow through the several cells is by gravity and there is no need of pumps to maintain the flow. The polarity of the electrode system may be reversed to obtain the same results.

The treated liquid is collected in a final chamber where the quality of treated discharge may be monitored and/or adjusted before being reused or dumped into a body of water.

DESCRIPTION OF THE PREFERRED EMBODIMENT

Figure 1:
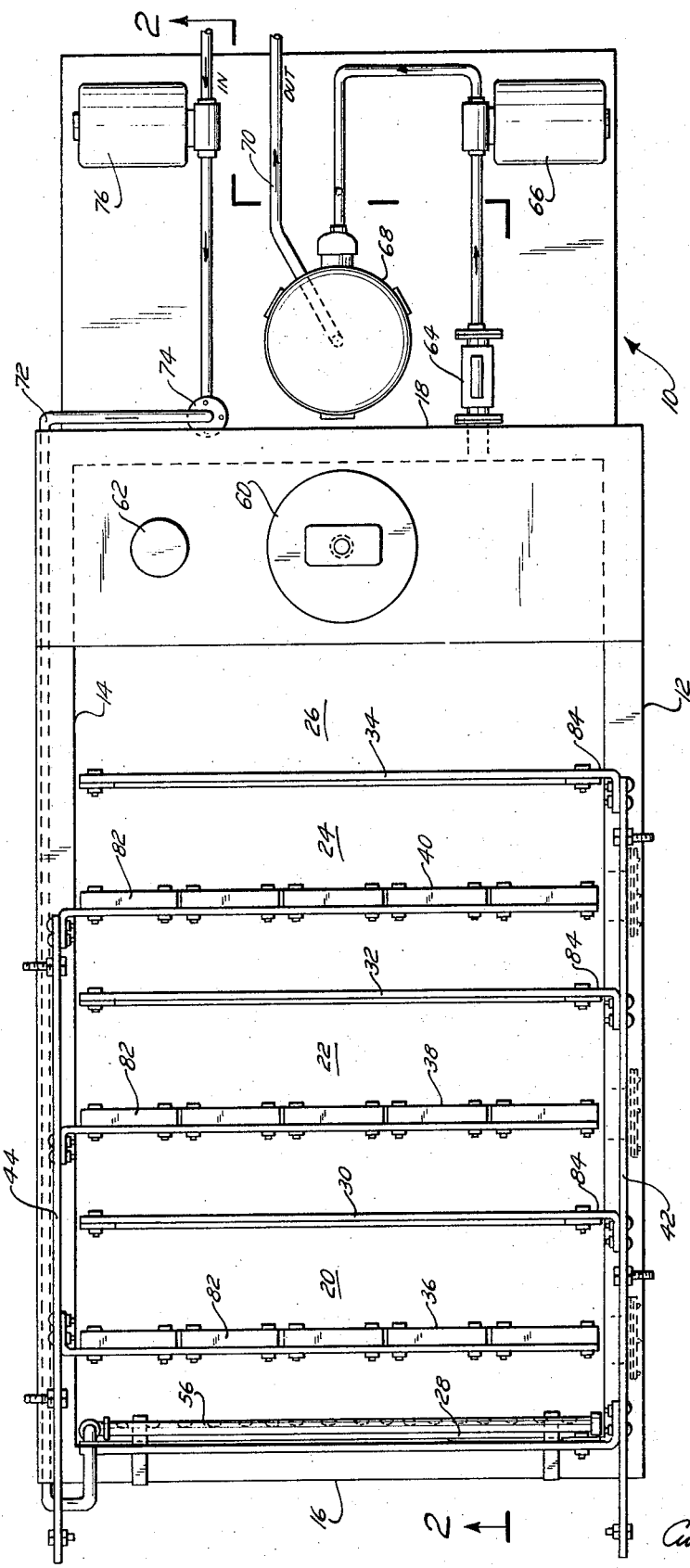
FIG. 1 is a top plan view of apparatus in accordance with the present invention.
Figure 2:
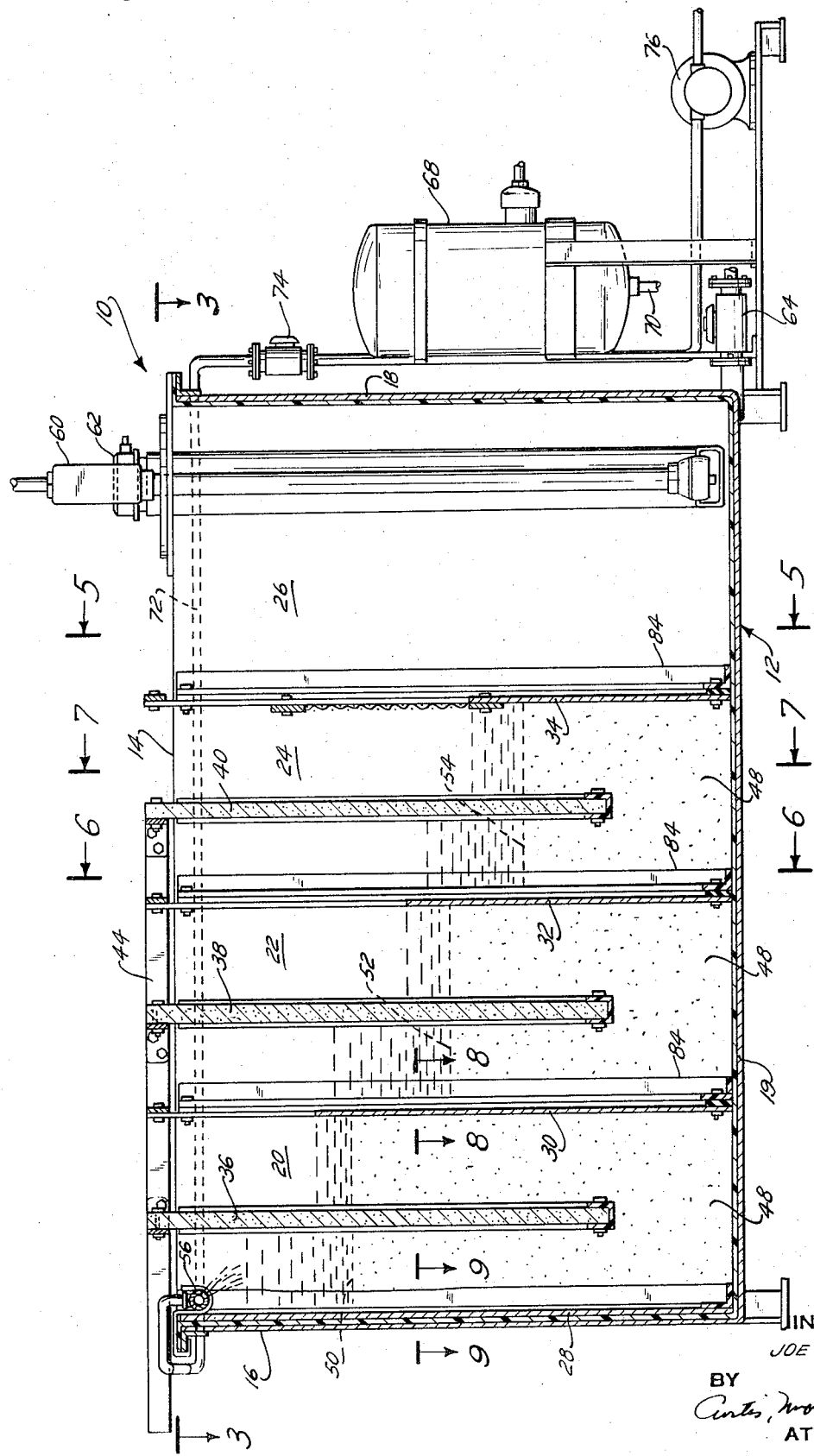
FIG. 2 is a side sectional view of the apparatus of FIG. 1 taken along lines 2—2 of FIG. 1.

Referring to the drawings and to FIGS. 1 and 2 in particular, a treatment apparatus 10 for carrying out the present invention is shown. A prominent part of the apparatus 10 is a tank 12 which has side walls 14, and end wall 16, and another end wall 18. In addition, the tank 12 is provided with a bottom wall 19. As shown in FIG. 2, the tank 12 is divided into four compartments, 20, 22, 24 and 26. The compartments 20–26 are formed by a combination of the end walls 16 and 18 and a series of cathode elements. A cathode 28 is positioned adjacent to the end wall 16. Spaced from the cathode 28 are three additional cathodes 30, 32 and 34. The heights of the cathodes 30, 32 and 34 are less than the end cathode 28. In addition, cathode 32 is of lesser height than cathode 30 and 34 is less than 32. The three cathodes 30, 32 and 34 act as weirs and are of sequentially reduced vertical extent.

Advantageously the cathodes 28–34 are fixedly fastened to the bottom wall 19 of the tank 12. A series of anodes 36, 38 and 40 are positioned in the compartment 20, 22 and 24, respectively, between each of the cathodes 28–34. The anodes are raised above the bottom wall 19 and cooperate with cathodes 30, 32 and 34 to form a baffle system for a liquid flowing through the tank 12.

The several cathodes are connected to a cathode buss bar 42 and the anodes are connected to an anode buss bar 44. The buss bars 42 and 44 are in turn connected to a source of direct current electromotive force 45.

In each of the compartments 20, 22, and 24, in which an anode is inserted, a packing of carbonaceous pellets of generally cylindrical shape are provided forming beds 48. The height of the bed in compartment 20 is designated by the numeral 50, in compartment 22 by the numeral 52 and in compartment 24 by the numeral 54. It will be noted that advantageously the heights of the beds are less than the vertical extent of the cathodes. This permits a certain amount of liquid to rise above the bed so that a minimum number of pellets will be carried from one compartment to the next.

Figure 4:
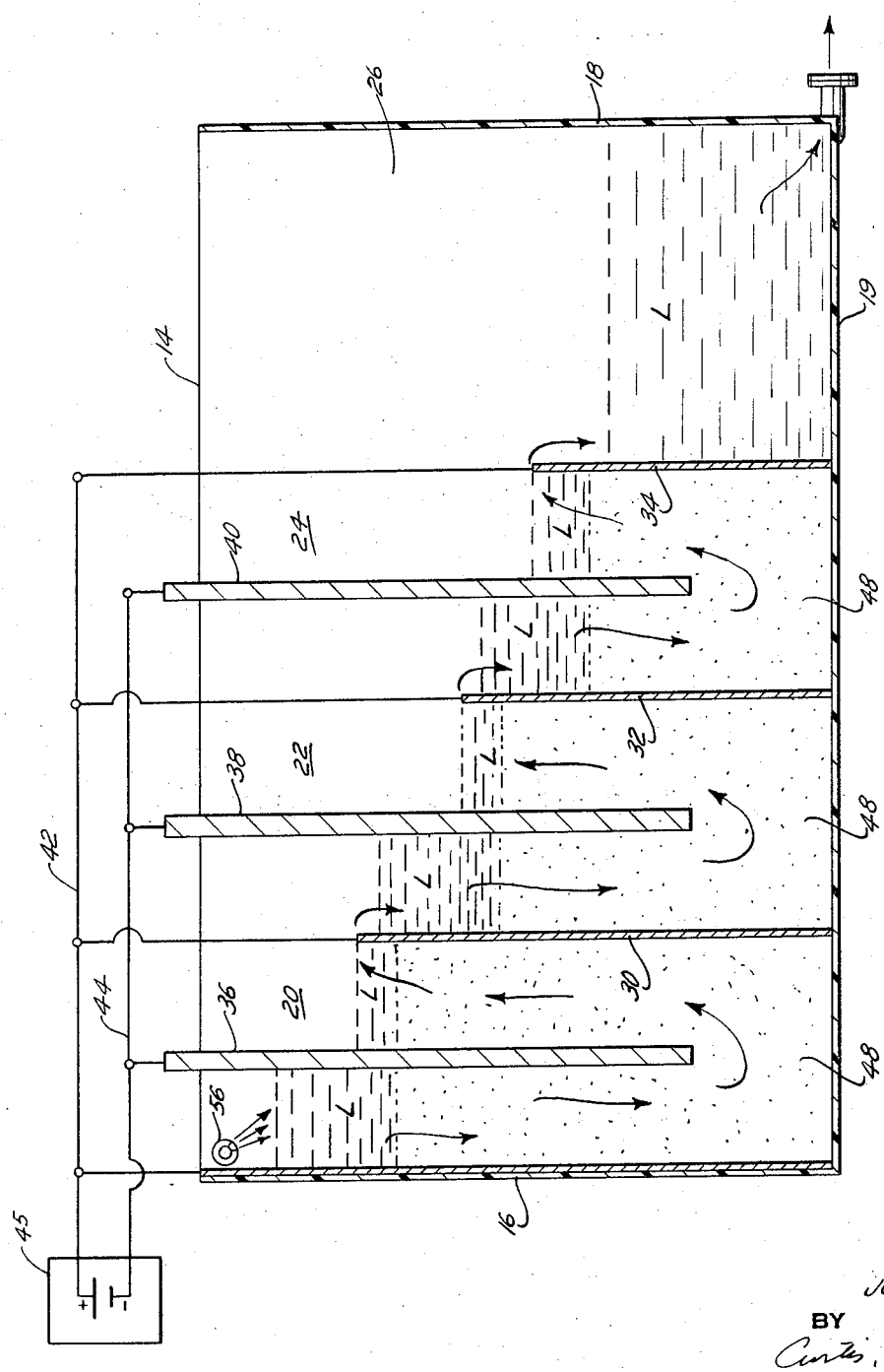
FIG. 4 is a side sectional schematic view of the apparatus of FIG. 1 showing the method of the present invention.

An example of the method of the present invention is shown in the schematic view of FIG. 4. The liquid "L" to be treated is inserted into compartment 20 from a header 56 which is connected to an inlet pump 58. The liquid enters this compartment between anode 26 and the end cathode 28. It then flows through the packing 48 in compartment 20, passing beneath anode 36 and rising upwardly between that anode and cathode 30. During its stay in compartment 20 the liquid is exposed to the electrolytic action between cathode 28 and anode 36 and between cathode 30 and anode 36. After passing through the bed of compartment 20 and overflowing over cathode 30, the liquid next passes into the second compartment 22. Here it passes through the bed in that compartment, under anode 38, over cathode 32 into compartment 24, under anode 40 and then finally over cathode 34 into the collection compartment 26.

The cathodes 30, 32 and 34 function as weirs and cooperate with the anodes 36, 38 and 40 to form a baffle system to provide a circuitous route for the flow of liquid through the compartments 20, 22 and 24.

As will be noted from a review of FIG. 4, there is a substantial hydrostatic head loss in each compartment due to the flow of liquid through the bed of pellets. However, in order to have a continuous operation without the necessity of special pumping equipment, the cathodes 30, 32 and 34 re advantageously sequentially of lesser height. Thus, it will be seen that the flow of liquid being treated through the apparatus 10 is at a natural rate of flow thereby permitting the liquid to be exposed for a sufficient period of time in each compartment to the electrolytic action between the adjacent cathodes and anodes and the packing of carbonaceous elements.

After the treated liquid has passed into the collection compartment 26, it is continuously sensed by a pH electrode 60 (specific ion electrode may also be employed) which is pre-set for the desired pH value of the treated liquid. Such pH electrodes are well known in the art and may serve to sense and adjust the pH value as may be required by controlling the addition of acids and alkalies.

Also located in the collection compartment 26 are electrodes of a liquid level controller 62. The liquid level controller 62 is of the floatless type and periodically starts and stops the inlet and outlet pumps 58 and 66. The pump 66 in turn is connected to a filter 68. After the liquid is removed from the collection compartment 26 by means of the pump 66, it passes through the filter 68 where undissolved solids may be removed. At this point the treated liquid is of sufficient purity to be dumped into a body of water or, if desired, reused in the processing system.

On the inlet side of the tank the head 56 is connected to a supply line 72 in which is mounted a control valve 74 and an inlet pump 58.

The tank 12 is preferably lined with a suitable electrically insulating material which is also substantially resistant to chemical corrosion. Such a material is polyvinyl chloride. Tanks of other non-conductive construction such as plastics or rubber may also be employed. In the drawings the lining 78 extends substantially throughout the entire tank although if it is desired it may be limited to that portion of the tank containing compartments 20, 22 and 24.

Figure 7:
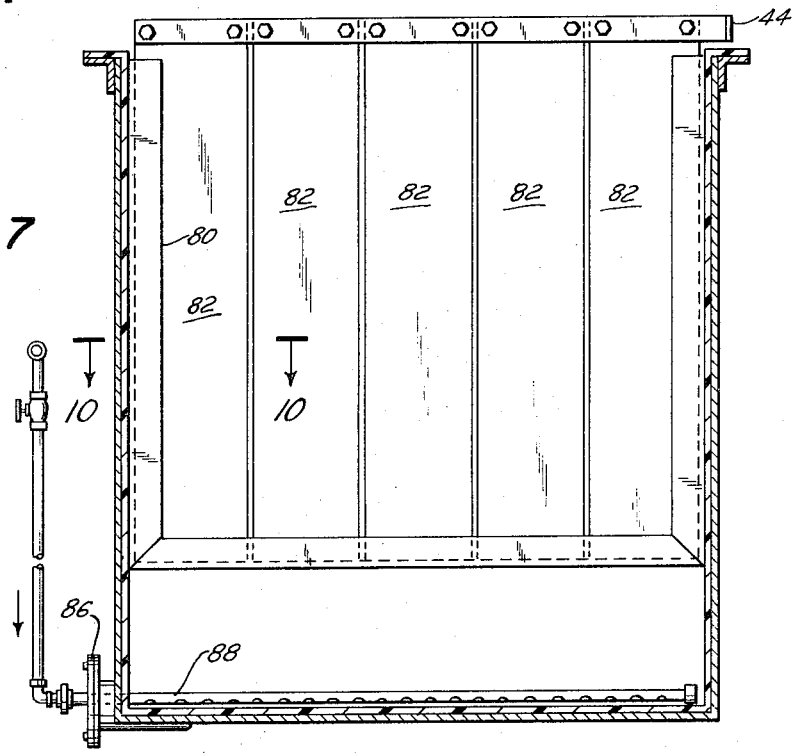
FIG. 7 is a sectional view along lines 7—7 of FIG. 2 showing an air purging means in relation to the lower portion of each compartment.
Figure 8:
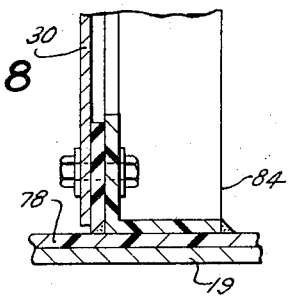
FIG. 8 is a detail section through the cathode along lines 8—8 of FIG. 2.
Figure 9:
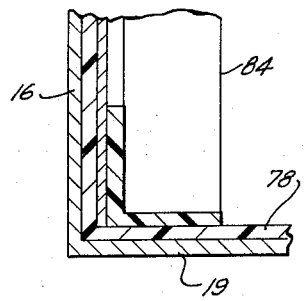
FIG. 9 is a section through the end cathode along lines 9—9 of FIG. 2.
Figure 10:
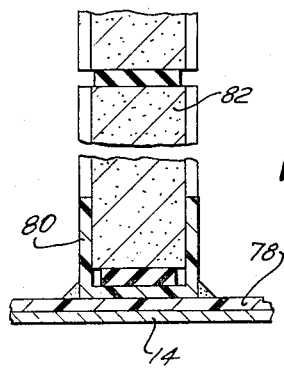
FIG. 10 is a section of the anode of FIG. 7 along lines 10—10.

As shown in FIG. 7, an anode support frame 80 provides support for the anode members. The support frame is mounted in the tank so that it is against the tank lining 78 and is thus insulated from the metal portions of the tank. In the illustrated embodiment, the anode is comprised of a series of sections 82 which are assembled into the complete anode. By using a sectionalized electrode, it is possible to replace one section which may become damaged without the necessity of replacing the entire electrode. However, it is to be realized that the anode may be made in one piece if so desired. The anode sections 82 are joined together by any suitable material that acts as a hydraulic barrier so that the liquid being treated will not short circuit between the anode sections rather than down and around it.

Figure 5:
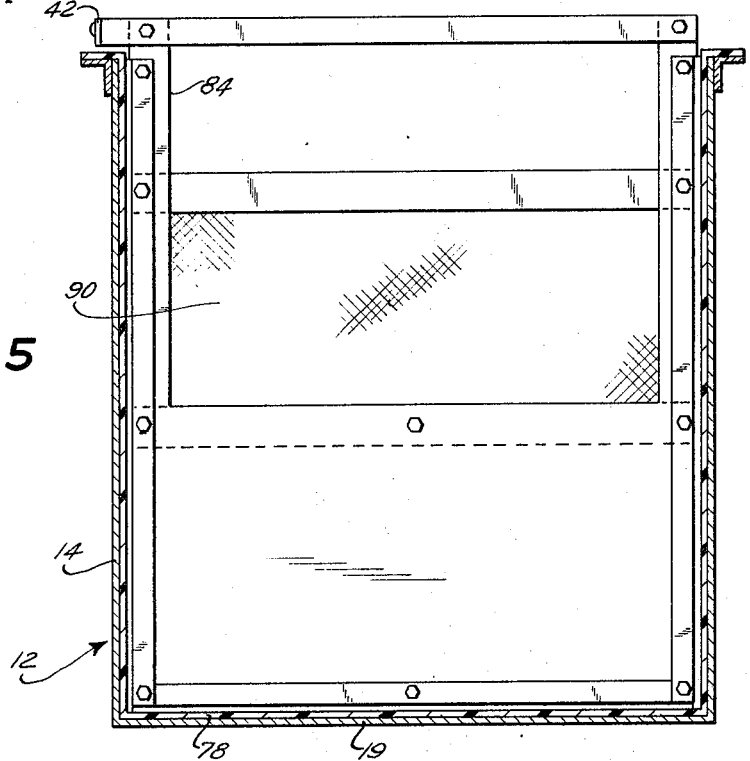
FIG. 5 is a sectional view along lines 5—5 of FIG. 2.
Figure 6:
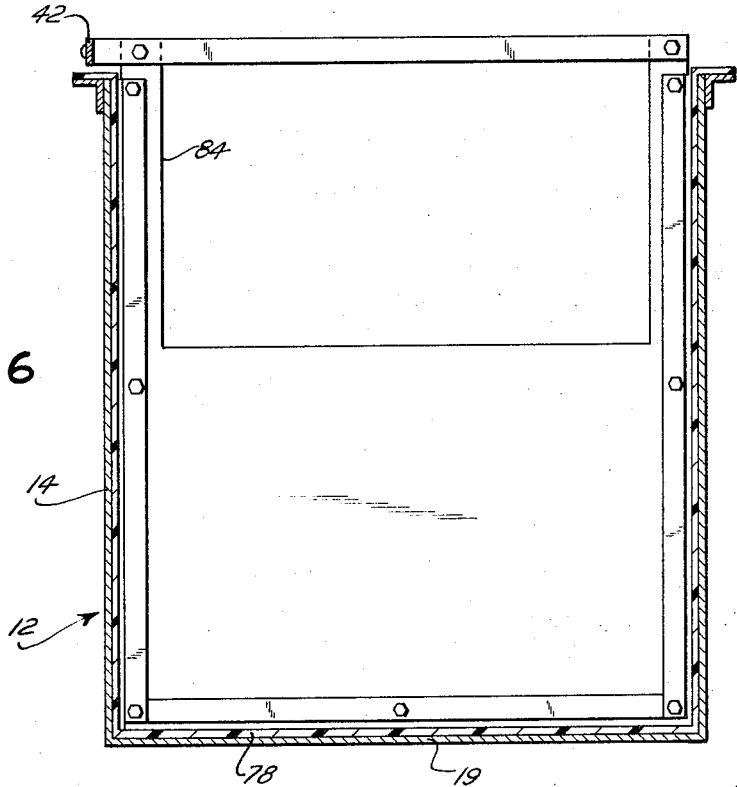
FIG. 6 is a sectional view along lines 6—6 of FIG. 2.

As shown in FIGS. 5 and 6 in particular, a cathode support frame 84 is also provided which mounts the several cathode units in a fixed position adjacent to the lining 78. As a result there is a resistance to short circuiting of the liquid through the tank.

Figure 3:
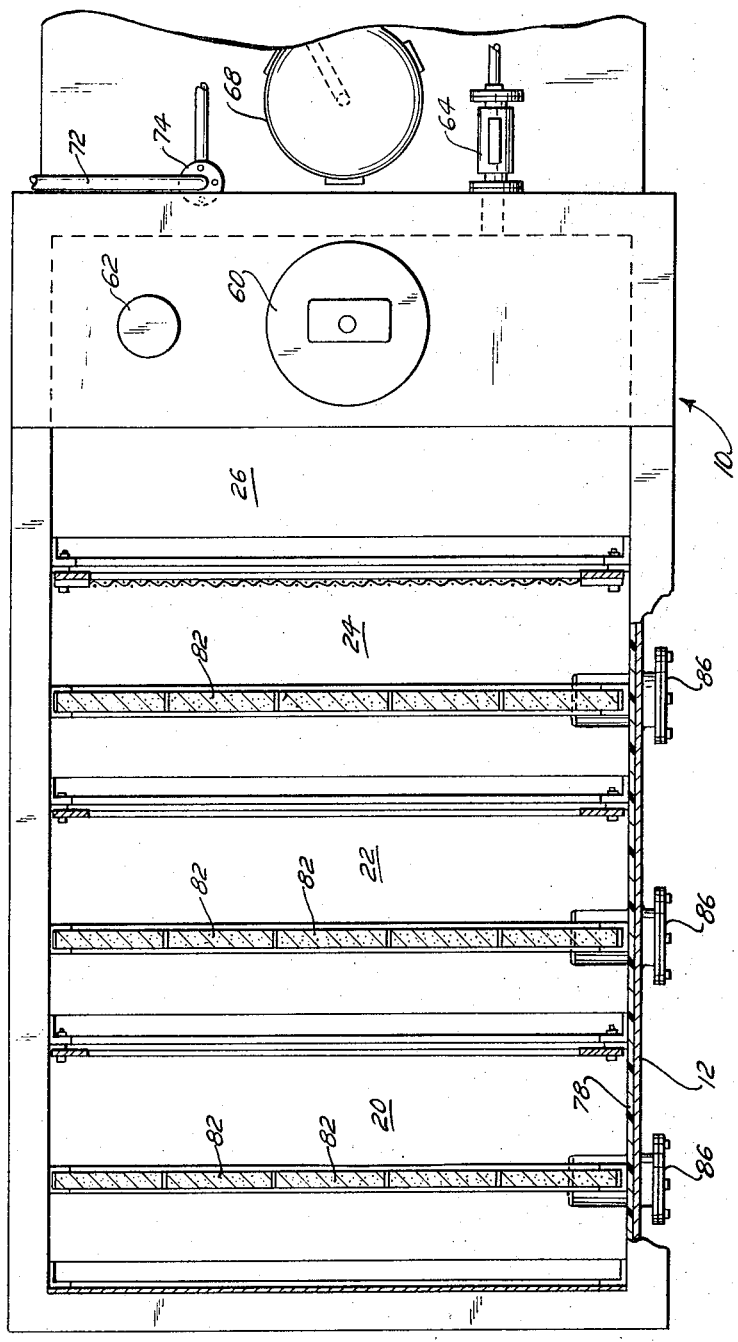
FIG. 3 is a sectional plan view of the apparatus taken along lines 3—3 of FIG. 2.

In FIG. 3, a series of clean out flanges 86 are shown. The covers on these flanges may be removed in order to clean out the bed materials 48 or collect any precipitates from the bottom region of compartments 20, 22 and 24.

The flanges 86 also permit air purging means 88 (as shown in FIG. 7) to be inserted into the lower portion of each compartment 20, 22 and 24 if desired. The purpose of the air purging means is to stir the beds 48 from the bottom. The same effect may also be obtained by using water or another selected liquid in place of air.

By stirring the beds, the elements are prevented from compacting and therefore reducing the effectiveness of the flow between the anodes and cathodes. In addition, the air purging means 88 may be used advantageously with cyanide solutions to provide additional oxygen for use in destroying the cyanide during the flow of such contaminated liquid through the tank. Air purging may also be used for resuspending precipitated matter.

Since the packing material 48 is comprised of carbonaceous pellets having a diameter of about 2 mm. and a length of about 5 to 6 mm., some of the material may possibly be carried over into compartment 26. To guard against this occurring, a screen 90 is mounted as a continuation of cathode 34. This screen has openings fine enough to retain the pellets thus preventing a loss of bed material.

In the illustrated embodiment the cathode electrodes are shown as a series of weirs. It is to be understood that if desired the polarity of the electrodes may be reversed and the illustrated cathodes would of course become anodes. However, the end result would be the same.

It will be obvious to those skilled in the art that the illustrated embodiment of the present invention provides an economical and dependable apparatus for use in removing pollutants from liquids, and the present invention may be practiced by others skilled in the art in various ways within the scope of the following claims:

What is claimed is:

1. Apparatus for electrochemically removing ions and other contaminants from aqueous liquids which comprises:
   (1) a liquid containing vessel having sidewalls and a bottom wall,
   (2) a plurality of anodes and cathodes connected to a direct current source,
   (3) said cathodes being spaced within said vessel, and said anodes positioned between the cathodes to form therewith a plurality of electrolytic cells,
   (4) a bed in each cell comprised of a multitude of solid elements and said bed contacting at least one cathode and one anode in each cell, said bed forming a packing medium of low electrical conductivity to establish a condition of bipolarity in the elements due to the applied potential,
   (5) means for introducing contaminated liquid into one of said cells,
   (6) said anodes and said cathodes being positioned with respect to the vessel to form a circuitous path for the flow of liquid through the cells whereby the liquid is subjected to the electrolytic action of the flow of current between the anodes and the cathodes and through the packing;
   (7) at least some of said electrodes spaced from the vessel bottom wall and alternate electrodes are in contact with said bottom wall whereby said electrodes form a baffle system to define the circuitous path for the flow of liquid through said vessel; and
   (8) successive alternate electrodes comprised of decreasing lesser vertical extent than the sidewalls of the vessel whereby said electrodes act as weirs of sequentially lesser heights and liquid may flow in sequence by gravity from one cell to the next.

2. Apparatus as defined in claim 1 wherein the vessel has endwalls and one electrode is adjacent to one end wall of the vessel and liquid is introduced into the cell of which said electrode is a component.

3. Apparatus as defined in claim 2 wherein the alternate electrodes other than the end wall electrode are in sequence relative to the end wall electrode of lesser vertical extent than the adjacent preceding cathode.

4. Apparatus as defined in claim 1 wherein the inner surface of the vessel in contact with contaminant liquid has a surface coating of an organic plastic material substantially inert to the contaminant liquid.

5. Apparatus as defined in claim 1 and further including means for injecting a stirring medium into the bed of packing in at least one cell.

6. Apparatus as defined in claim 1 and further including a treated liquid collection compartment adjacent to the cell formed by the alternate electrode of least vertical extent.

7. Apparatus as defined in claim 6 and further including means for sensing and if required adjusting the pH of the treated liquid contained therein.

8. Apparatus as defined in claim 6 and further including a screen member extending upwardly from the electrode of least vertical extent whereby elements of the packing are restrained from being carried by the liquid passing into the collection compartment.

9. Apparatus as defined in claim 6 and further including means for removing the treated liquid from the collection compartment.

References Cited

UNITED STATES PATENTS

| | | | |
|---|---|---|---|
| 398,101 | 2/1889 | Webster, Jr. | 204—149 |
| 844,262 | 2/1907 | Dieterich | 204—149 |
| 1,069,169 | 8/1913 | Parker | 204—149 X |
| 1,906,914 | 5/1933 | Mason | 204—149 X |
| 3,616,356 | 10/1971 | Roy | 204—152 |

FOREIGN PATENTS

| | | | |
|---|---|---|---|
| 648,201 | 1/1951 | Great Britain | 204—149 |
| 826,153 | 10/1969 | Canada | 204—149 |

JOHN H. MACK, Primary Examiner

A. C. PRESCOTT, Assistant Examiner

U.S. Cl. X.R.

204—149, 152